United States Patent
GV et al.

(10) Patent No.: US 8,409,040 B1
(45) Date of Patent: Apr. 2, 2013

(54) POWERTRAIN WITH TWO PLANETARY GEAR SETS AND TWO MOTOR/GENERATORS FOR HYBRID VEHICLE

(75) Inventors: Ravikanth GV, Karnataka (IN); Alle Kumar Naveen, Andhra Pradesh (IN); Kumpatla V Naidu, Karnataka (IN); P Karthikeyan, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/238,150

(22) Filed: Sep. 21, 2011

(51) Int. Cl.
*F16H 3/72* (2006.01)
*F16H 3/44* (2006.01)

(52) U.S. Cl. .............................. 475/5; 475/282

(58) Field of Classification Search .............. 475/5, 282, 475/288, 290
See application file for complete search history.

(56) References Cited

U.S. PATENT DOCUMENTS

| | | | |
|---|---|---|---|
| 8,075,435 B2* | 12/2011 | Si | 475/5 |
| 2003/0199352 A1* | 10/2003 | Tsai et al. | 475/5 |
| 2010/0227723 A1* | 9/2010 | Seo et al. | 475/5 |

* cited by examiner

*Primary Examiner* — Edwin A Young
(74) *Attorney, Agent, or Firm* — Quinn Law Group, PLLC

(57) ABSTRACT

A powertrain includes an input member, an output member, and a stationary member. A first and a second electric motor/generator are provided. Only two planetary gear sets are used, each having a respective first, second, and third member. An interconnecting member connects one of the members of a first one of the planetary gear sets to one of the members of a second one of the planetary gear sets. The input member, the output member, the first motor/generator and the second motor/generator are each continuously connected for common rotation with a different one of the members of the planetary gear sets that is not connected by the interconnecting member. Four brakes are each selectively engageable to ground a different respective one of the members of the planetary gear sets that is not connected by the interconnecting member to the stationary member.

17 Claims, 2 Drawing Sheets

|    | 90 | 91 | 92 | 93 | 94 | 95 | 96 | 97 | 98 |
|----|----|----|----|----|----|----|----|----|----|
| 50 | x  |    |    | x  |    |    |    |    | x  |
| 52 |    | x  | x  |    |    |    |    |    |    |
| 54 |    |    | x  | x  |    |    | x  |    | x  |
| 56 |    |    |    | x  |    | x  |    |    |    |
| 12 |    |    |    | o  | o  | o  | o  |    | o  |

*Fig-2*

POWERTRAIN WITH TWO PLANETARY GEAR SETS AND TWO MOTOR/GENERATORS FOR HYBRID VEHICLE

TECHNICAL FIELD

The invention relates to a powertrain for a hybrid vehicle. The powertrain has two planetary gear sets, two motor/generators, and four brakes.

BACKGROUND

A powertrain with an electrically-variable transmission (EVT) typically has an input member, an output member, and two electric motor/generators connected to different members of planetary gear sets. Selectively engageable torque-transmitting mechanisms allow one or more electrically-variable modes of operation, fixed speed ratio modes, and an electric-only (battery-powered) mode. EVTs may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate efficiency losses due to engine drag. Braking energy captured via regenerative braking (or electrical energy generated during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand.

Various hybrid and electric powertrain architectures are known for managing the input and output torques of various prime movers in hybrid vehicles, most commonly internal combustion engines and electric machines. Some EVTs provide for continuously variable speed ratios by combining features from both series and parallel hybrid power train architectures. EVTs are operable in fixed gears with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque, continuously variable speed ratios, electrically-dominated launches, regenerative braking and engine off idling.

Some hybrid vehicles utilize larger battery packs, adding to the vehicle weight, increasing fuel consumption and vehicle cost. These vehicles operate in an electric-only mode over a predetermined driving range, and then the engine charges the battery through one of the motor/generators motor when driving beyond the optimal range. Range, endurance and durability aspects suggest that a lower battery state of charge and higher fuel consumption required in charging the battery is generally undesirable. The rate of discharge of battery and engine power are calculated based on driver commanded throttle and vehicle speed

SUMMARY

It would be advantageous to optimize and constrain battery rate of discharge and engine fuel rate output. Accordingly, a hybrid powertrain is provided with a minimum of components to improve a power to weight ratio of the powertrain, increasing fuel economy and electric range of a vehicle with the powertrain. Additionally, three different electric-only operating modes are available, so that electric-only operation is available across a broad range of speeds of a vehicle with the powertrain. In the event of engine failure, any of the electric-only operating modes may be selected as a limp home mode.

The powertrain includes an input member, an output member, and a stationary member, such as a transmission casing. A first and a second electric motor/generator are provided. Only two planetary gear sets are used, each having a respective first, second, and third member. An interconnecting member connects one of the members of a first one of the planetary gear sets to one of the members of a second one of the planetary gear sets. The input member, the output member, the first motor/generator and the second motor/generator are each continuously connected for common rotation with a different one of the members of the planetary gear sets that is not connected by the interconnecting member. Four torque-transmitting mechanisms, all of which are brakes, and may be referred to as brake clutches are each selectively engageable to ground a different respective one of the members of the planetary gear sets that is not connected by the interconnecting member to the stationary member. Engagement of a different one or ones of the brakes and operation of one or both of the motor/generators as a motor establishes three electric-only operating modes between the input member and the output member. The powertrain is operable to provide seven different operating modes for forward propulsion, including three electric-only operating modes, two electrically-variable operating modes, a series operating mode and a fixed speed ratio operating mode. Three of the operating modes may be used for reverse propulsion as well.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a table showing an engagement schedule to establish various operating modes of the powertrain of FIG. 1.

DETAILED DESCRIPTION

Figure 1:
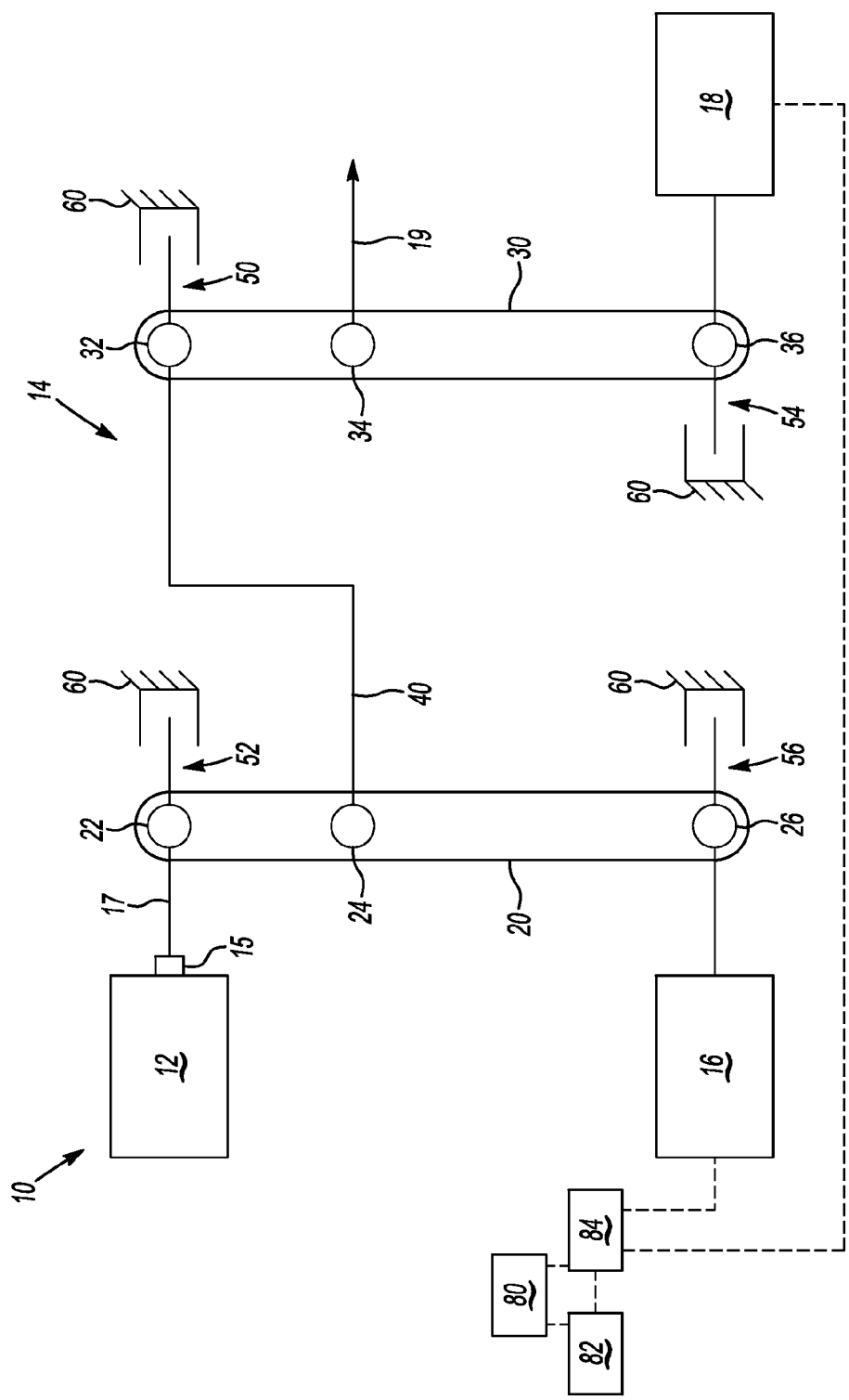
FIG. 1 is a schematic illustration of a powertrain.

Referring to the drawings, FIG. 1 shows a hybrid powertrain 10 that includes a prime mover, such as an internal combustion engine 12, connected with a hybrid transmission 14. Other types of prime movers, such as fuel cells, pneumatic engines, etc. may be used in place of an internal combustion engine 12. The hybrid transmission 14 includes two additional motive sources, a first motor/generator 16 and a second motor/generator 18. The engine 12 and motor/generators 16 and 18 are interconnected via two planetary gear sets 20 and 30 to provide various operating modes.

A first planetary gear set 20 includes a first member 22, a second member 24, and a third member 26. The members 22, 24, and 26 include in any order a sun gear member, a ring gear member, and a carrier member that rotatably supports pinion gears that mesh with both the sun gear member and the ring gear member. In the embodiment shown, the first member 22 is a ring gear member, the second member 24 is a carrier member, and the third member 26 is a sun gear member. A person of ordinary skill in the art will understand the structure of the simple planetary gear set 20, which is shown only schematically in lever diagram form in FIG. 1.

A second planetary gear set 30 includes a first member 32, a second member 34, and a third member 36. The members 32, 34, 36 include in any order a sun gear member, a ring gear member, and a carrier member that rotatably supports a set of pinions that mesh with both the sun gear member and the ring gear member. In the embodiment shown, the first member 32 is a ring gear member, the second member 34 is a carrier member, and the third member 36 is a sun gear member.

The transmission 14 has an input member 17 continuously connected for common rotation with the first member 22, and also with an output member 15 of the engine 12. The engine output member 15, which may be an engine crankshaft or a ratio multiplying connection to the engine crankshaft, such as a geared connection or a series of pulleys and sprockets. The engine output member 15 is continuously connected for common rotation with the first member 22.

The transmission 14 also has an output member 19 that is connected through a final drive mechanism (not shown) to vehicle wheels (also not shown) to provide tractive power to the wheels to propel the vehicle. The output member 19 is continuously connected for common rotation with the second member 34 of the second planetary gear set 30.

A rotor of the first motor/generator 16 is connected for common rotation with the third member 26 of the first planetary gear set 20. A rotor of the second motor/generator 18 is connected for common rotation with the third member 36 of the second planetary gear set 30. An interconnecting member 40 continuously connects the second member 24 of the first planetary gear set 20 for common rotation with the first member 32 of the second planetary gear set 30. The interconnecting member 40 may be a shaft or hub The transmission 14 includes four torque-transmitting mechanisms, all of which are brakes and may also be referred to as brake clutches. A first brake 50 is selectively engageable to ground the first member 32 of the second planetary gear set 30 to a stationary member 60, such as a transmission casing, so that the first member 32 does not rotate. The first brake 50 also grounds the second member 24 of the first planetary gear set 20 to the stationary member 60 via the interconnecting member 40. A second brake 52 is selectively engageable to ground the first member 22 of the first planetary gear set 20 to the stationary member 60 so that the first member 22 does not rotate. A third brake 54 is selectively engageable to ground the third member 36 of the second planetary gear set 30 to the stationary member 60 so that the third member 36 does not rotate. A fourth brake 56 is selectively engageable to ground the third member 26 of the first planetary gear set 20 to the stationary member 60 so that the third member 26 does not rotate.

Stator portions of the motor/generators 16 and 18 are operatively connected to an energy storage device 80 that may be one or more batteries. Other electric storage devices that have the ability to store electric power and dispense electric power may be used in place of the batteries. A controller 82 operatively connected to the motor/generators 16 and 18 monitors the speed of the rotors. The controller 82 also receives information regarding engine speed, either from a separate engine controller, or by connection to the engine 12. Based on this and other vehicle operating conditions, such as driver accelerator commands, the controller 82 is operable to provide electrical energy from the energy storage device 80 through a power inverter 84 to either or both motor/generators 16 and 18 to cause the motor/generators to function as motors, adding torque to the transmission 14. The power inverter 84 converts direct current to alternating current when electrical power is provided to the motor/generators 16 and/or 18. If the information received by the controller 82 indicates that either motor/generator 16 or 18 should be operated as a generator, converting mechanical energy into electrical energy, the controller 82 is operable to cause the power inverter 84 to convert alternating current provided from either motor/generator into direct current stored in the energy storage device 80. The dashed lines between the motor/generators 16, 18, the energy storage device 80, the controller 82, and the inverter 84 represent transfer conductors for relaying electrical current or signals between the components.

FIG. 2 is a table indicating the engagement status of each of the brakes 50, 52, 54 and 56, as well as the operating status of the engine 12 (whether on or off) to establish seven different forward propulsion modes as well as a neutral mode and a neutral charging mode as described herein. In FIG. 2, an "X" indicates that the brake represented by the column is engaged. A box that is empty indicates that the brake represented by the column is not engaged. An "0" indicates that the engine 12 is on. A box that is empty in the column representing the engine 12 means that the engine is off (i.e., not receiving fuel).

In FIG. 2, row 90 indicates a first electric-only operating mode EV1. In the first electric-only operating mode EV1, brake 50 is engaged to ground the first member 32 and the second member 24 to the stationary member 60. The engine 12 is off and the motor/generator 16 is off. The second motor/generator 18 is operated as a motor to provide forward torque at the output member 19, such as to launch a vehicle having the powertrain 10. If the third member 36 is a sun gear member and the second member 34 is a carrier member, then torque will be multiplied by the second planetary gear set 30.

Row 91 indicates a second electric-only operating mode EV2 in which brake 52 is engaged and the engine 12 is off and held at zero speed by the brake 52. Both of the motor/generators 16, 18 are operated as motors to provide forward torque at the output member 19. In an embodiment where the third member 26 is a sun gear member, the second member 24 is a carrier member, the first member 32 is a ring gear member and the second member 34 is a carrier member, then the second electric-only operating mode may be used when greater torque is required than is provided in the first electric-only operating mode.

Row 92 indicates a third electric-only operating mode EV3 in which brakes 52 and 54 are engaged, the engine 12 and the motor/generator 18 are off, and the first motor/generator 16 is operated as a motor to provide forward torque at the output member 19 through the planetary gear sets 20, 30. In an embodiment where the third member 26 is a sun gear member, the second member 24 is a carrier member, the first member 32 is a ring gear member, the second member 34 is a carrier member, and the third member 36 is a sun gear member, then the second electric-only operating mode provides greater torque multiplication than the other electric-only operating modes and may be used for performance and towing.

Row 93 indicates a fixed ratio operating mode in which brakes 54 and 56 are engaged, the engine 12 is on, and both motor/generators 16, 18 are off. Accordingly, the fixed ratio operating mode is a mechanical point in which the speed of the output member 19 is at a fixed ratio to the speed of the input member 17 and all power is provided by the engine 12. The fixed ratio operating mode may be efficient to use while cruising at a middle range of speeds. The fixed ratio operating mode may also be used as a limp home mode in the event of failure of one of the motor/generators 16, 18, or in the case that the energy storage device 80 becomes inoperable.

Row 94 indicates a hybrid series operating mode in which the brake 50 is engaged to ground the first gear member 32 to the stationary member 60, the engine 12 is on and provides power to the first motor/generator 16 which operates as a generator to either provide electrical power to the energy storage device 80 or to the second motor/generator 18 which operates as a motor as necessary to provide torque at the output member 19. Operating in the series mode allows better fuel economy at lower speeds of the output member 19, because the engine 12 may be operated at its optimal speed for fuel economy as there is no mechanical connection from the engine 12 to the output member 19.

Row 95 indicates a first electrically-variable operating mode EVT1 in which brake 56 is engaged, the engine 12 is on, and the second motor/generator 18 is operated as a motor to provide forward torque at the output member 19 to propel the vehicle. The engine 12 can be operated at its best operating speed to improve fuel economy, while the speed of the motor/generator 18 is varied to meet the changing speed and torque requirements at the output member 19.

Row 96 indicates a second electrically-variable operating mode EVT2 in which brake 54 is engaged, the engine 12 is on, and the first motor/generator 16 is operated as a motor to provide forward torque at the output member 19 to propel the vehicle. The engine 12 can be operated at its best operating speed to improve fuel economy, while the speed of the motor/generator 16 is varied to meet the changing speed and torque requirements at the output member 19.

Row 97 indicates a neutral mode in which none of the brakes 50, 52, 54 and 56 are engaged and the engine is off. Row 98 indicates a neutral charging mode in which the brakes 50 and 54 are engaged and the engine is on. Because the brakes 50 and 54 are engaged, the second planetary gear set 30 is locked, including the second member 34, which prevents rotation of the output member 19. Due to the interconnecting member 40, the second member 24 of the first planetary gear set 20 is also grounded. Accordingly, the engine 12 may be on and powering the first motor/generator 16 which is controlled to act as a generator to charge the energy storage device 80.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
   an input member;
   an output member;
   a stationary member;
   a first and a second electric motor/generator;
   only two planetary gear sets each having a respective first, second, and third member;
   an interconnecting member connecting one of the members of a first one of the planetary gear sets to one of the members of a second one of the planetary gear sets; the input member, the output member, the first motor/generator and the second motor/generator each being continuously connected for common rotation with a different one of the members of the planetary gear sets that is not connected by the interconnecting member;
   four brakes each selectively engageable to ground a different respective one of the members of the planetary gear sets that is not connected by the interconnecting member to the stationary member; wherein engagement of a different one or ones of the brakes and operation of one or both of the motor/generators as a motor establishes three electric-only operating modes between the input member and the output member.

2. The powertrain of claim 1, wherein one of the electrical-only operating modes is provided between the input member and the output member when a first one of the four brakes is engaged and the second motor/generator is operated as a motor.

3. The powertrain of claim 1, wherein one of the electrical-only operating modes is provided between the input member and the output member when a second one of the four brakes is engaged and both of the motor/generators are operated as motors.

4. The powertrain of claim 1, wherein one of the electrical-only operating modes is provided between the input member and the output member when a second one and a third one of the four brakes are engaged and the first motor/generator is operated as a motor.

5. The powertrain of claim 1, further comprising:
   an engine having an engine crankshaft connected for rotation with the input member; and
   wherein an electrically-variable operating mode is provided between the input member and the output member when the engine is on, one of the four brakes is engaged, and the second motor/generator is operated as a motor.

6. The powertrain of claim 1, further comprising:
   an engine having an engine crankshaft connected for rotation with the input member; and
   wherein an electrically-variable operating mode is provided between the input member and the output member when the engine is on, one of the four brakes is engaged, and the first motor/generator is operated as a motor.

7. The powertrain of claim 1, further comprising:
   an engine having an engine crankshaft connected for rotation with the input member; and
   wherein a fixed speed ratio is established between the input member and the output member when the engine is on and two of the four brakes are engaged.

8. The powertrain of claim 1, further comprising:
   an engine having an engine crankshaft connected for rotation with the input member; and
   wherein a series operating mode is established when the engine is on, one of the four brakes is engaged, the first motor/generator acts as a generator, and the second motor/generator acts as a motor.

9. A powertrain comprising:
   an input member adapted for connection with an engine crankshaft;
   an output member;
   a stationary member;
   a first electric motor/generator;
   a second electric motor/generator;
   a first planetary gear set having a first member, a second member, and a third member; wherein the input member is continuously connected for rotation with the first member of the first planetary gear set;
   a second planetary gear set having a first member, a second member, and a third member;
   an interconnecting member continuously connecting the second member of the first planetary gear set to the first member of the second planetary gear set for rotation at the same speed;
   wherein the first motor/generator is continuously connected for rotation with the third member of the first planetary gear set;

wherein the output member is continuously connected for rotation with the second member of the second planetary gear set;

wherein the second motor/generator is continuously connected for rotation with the third member of the second planetary gear set;

a first brake selectively engageable to ground the first member of the second planetary gear set to the stationary member;

a second brake selectively engageable to ground the first member of the first planetary gear set to the stationary member;

a third brake selectively engageable to ground the third member of the second planetary gear set to the stationary member; and a fourth brake selectively engageable to ground the third member of the first planetary gear set to the stationary member; wherein the brakes are engageable in different combinations and the motor/generators are operable as motors, as generators, or are off to establish different operating modes between the input member and the output member.

10. The powertrain of claim 9, wherein an electrical-only operating mode is established between the input member and the output member when the first brake is engaged, and the second motor/generator is operated as a motor.

11. The powertrain of claim 9, wherein an electrical-only operating mode is provided between the input member and the output member when the second brake is engaged, and both of the motor/generators are operated as motors.

12. The powertrain of claim 9, wherein an electrical-only operating mode is provided between the input member and the output member when the second and third brakes are engaged and the first motor/generator is operated as a motor.

13. The powertrain of claim 9, further comprising:

an engine having the engine crankshaft connected for rotation with the input member; and wherein an electrically-variable operating mode is provided between the input member and the output member when the engine is on, the fourth brake is engaged, and the second motor/generator is operated as a motor.

14. The powertrain of claim 9, further comprising:

an engine having the engine crankshaft connected for rotation with the input member; and wherein an electrically-variable operating mode is provided between the input member and the output member when the engine is on, the third brake is engaged, and the first motor/generator is operated as a motor.

15. The powertrain of claim 9, further comprising:

an engine having the engine crankshaft connected for rotation with the input member; and wherein a fixed speed ratio is established between the input member and the output member when the third brake and the fourth brake are engaged.

16. The powertrain of claim 9, further comprising:

an engine having the engine crankshaft connected for rotation with the input member; and wherein a series operating mode is established when the engine is on, the first brake is engaged, the first motor/generator acts as a generator, and the second motor/generator acts as a motor.

17. A powertrain comprising:

an engine having an engine crankshaft;

a transmission having:

a first and a second planetary gear set each having multiple members including a ring gear member, a carrier member, and a sun gear member;

only one interconnecting member continuously connecting one of the members of the first planetary gear set for common rotation with one of the members of the second planetary gear set;

two motor/generators; wherein one of the motor/generators is connected for common rotation with one of the members of the first planetary gear set that is not connected by the interconnecting member, and the other of the motor/generators is connected for common rotation with one of the members of the second planetary gear set that is not connected by the interconnecting member;

a stationary member;

only four torque-transmitting mechanisms, each of which is a brake that grounds a different respective one of said members of the planetary gear sets to the stationary member; and wherein the powertrain is operable to provide forward propulsion in seven different operating modes including three electric-only operating modes in which one or both of the motor/generators provides propulsion, and including a series operating mode in which the engine and one of the motor/generators provide forward propulsion and one of the motor/generators acts as a generator.

* * * * *